(12) United States Patent  
Yang et al.

(10) Patent No.: US 7,933,092 B1
(45) Date of Patent: *Apr. 26, 2011

(54) METHOD AND APPARATUS FOR ESTIMATING A POSITION OF A HEAD IN A DISK DRIVE

(75) Inventors: Xueshi Yang, Sunnyvale, CA (US); Michael Madden, Mountain View, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/470,987

(22) Filed: May 22, 2009

Related U.S. Application Data

(63) Continuation of application No. 11/765,889, filed on Jun. 20, 2007, now Pat. No. 7,538,967.

(60) Provisional application No. 60/823,204, filed on Aug. 22, 2006.

(51) Int. Cl.
*G11B 5/596* (2006.01)
(52) U.S. Cl. .................... 360/77.07; 702/191
(58) Field of Classification Search ........... None
See application file for complete search history.

(56) References Cited

U.S. PATENT DOCUMENTS

| 5,249,150 | A | 9/1993 | Gruber et al. |
| 6,025,970 | A | 2/2000 | Cheung |
| 6,384,994 | B1 | 5/2002 | Smith et al. |
| 6,426,845 | B1 | 7/2002 | Sacks et al. |
| 6,754,016 | B2 | 6/2004 | Messner et al. |
| 6,762,895 | B2 | 7/2004 | Osafune |
| 7,158,333 | B1 | 1/2007 | Sutardja et al. |
| 7,289,284 | B2 | 10/2007 | Arai et al. |
| 2003/0002199 | A1 | 1/2003 | Au et al. |
| 2003/0026016 | A1 | 2/2003 | Heydari et al. |
| 2005/0264922 | A1 | 12/2005 | Erden et al. |
| 2007/0239403 | A1 | 10/2007 | Hornbostel |

*Primary Examiner* — Jason C Olson

(57) ABSTRACT

In a method for providing an estimate of a head position for a disk drive, a readback signal is filtered. The readback signal includes a first position signal component corresponding to a first position pattern on a disk, and includes a second position signal component corresponding to a second position pattern on the disk. Filtering the readback signal includes using a filter determined based on statistical information regarding a noise component of the readback signal. An estimate of an amplitude of the first position signal component is generated based on the filtered readback signal, and an estimate of an amplitude of the second position signal component is generated based on the filtered readback signal. An estimate of a head position with respect to a track on the disk is generated based on the estimate of the amplitude of the first position signal component and the estimate of the amplitude of the second position signal component.

20 Claims, 10 Drawing Sheets

PRIOR ART

PRIOR ART

PRIOR ART

METHOD AND APPARATUS FOR ESTIMATING A POSITION OF A HEAD IN A DISK DRIVE

CROSS-REFERENCES TO RELATED APPLICATIONS

The present application is a continuation of U.S. application Ser. No. 11/765,889, filed on Jun. 20, 2007, now U.S. Pat. No. 7,538,967, entitled "METHOD AND APPARATUS FOR ESTIMATING A POSITION OF A HEAD IN A DISK DRIVE," which claims the benefit of U.S. Provisional Application No. 60/823,204, entitled "ALMOST EFFICIENT SERVO DEMODULATION," filed on Aug. 22, 2006. Both of these applications are hereby incorporated by reference herein in their entireties.

FIELD OF TECHNOLOGY

The present disclosure relates generally to hard disk drives, and more particularly, to generating an estimate of a position of a magnetic head.

BACKGROUND

FIG. 1 is a block diagram of an example prior art magnetic disk drive system 100 having a head-disk assembly 104 and a hard disk control system 108. The hard-disk assembly 104 includes one or more magnetic disks 112 and one or more corresponding magnetic heads 116 on a moving arm 120. The moving arm 120 may be coupled to an actuator 124 that may be used to position the magnetic heads 116 over the magnetic disks 112. The hard disk control system 108 includes an interface 128 that receives data to be written to the one or more magnetic disks 112 and transmits data read from the one or more magnetic disks 112. The interface 128 may be communicatively coupled to a microprocessor of a computing system such as a server, a personal computer, a personal digital assistant (PDA), etc., or of a consumer electronics device such as a cellular phone, a set top box, a gaming system, etc., to allow the microprocessor to store data to and read data from the one or more magnetic disks 112. The interface 128 may be coupled to a hard disk controller (HDC) 132. The HDC 132 is in turn coupled to a read/write channel device (RWC) 136 and an actuator controller 140. The RWC 136 is coupled to the magnetic heads 116 and the actuator controller 140 is coupled to the actuator 124. Additionally, the RWC 136 may be coupled to the actuator controller 140. The RWC 136 may include a read channel device.

Data to be written to the disks 112 are received via the interface 128. The HDC 132 transmits signals to the actuator controller 140 indicating the disk and the track on which data is to be written. During positioning, the RWC 136 reads position signal information from the appropriate disk 112 and provides this position signal information to the actuator controller 140. The actuator controller 140 uses the position signal information from the RWC 136 to accurately position the appropriate magnetic head 116 to the desired track. Meanwhile, the HDC 132 will provide the data to be written to the RWC 136. Once the magnetic heads 116 are appropriately positioned, the RWC 136 generates an analog write signal and provides it to the appropriate magnetic head 116 such that the data is magnetically stored on the disk 112 at the desired position.

When data is to be read from one of the disks 112, the microprocessor of the computing device or consumer electronics device provides a request to the interface 128, indicating the data to be read. The interface 128 provides the indication to the HDC 132. Then, the HDC 132 transmits signals to the actuator controller 140 indicating the disk and the track from which data is to be read. During positioning, the RWC 136 generates position signals based on position information written on the disk 112 and provides these position signals to the actuator controller 140. The actuator controller 140 uses the position signals to accurately position the magnetic head 116 to a center of a desired track. Additionally, the HDC 132 indicates to the RWC 136 from which of the disks 112 (if there are multiple disks) to read and when to begin reading so that data from an appropriate portion on the disk 112 will be read. In response, at the appropriate time, the RWC 136 generates a digital signal from an analog signal received from the magnetic head 116. This digital signal is provided to the HDC 132. The HDC 132 provides the retrieved data to the interface 128, which in turn provides it to the requesting microprocessor.

FIG. 2 is an illustration of an example magnetic media disk 150 that may be utilized in the disk drive system 100 of FIG. 1. The disk 150 includes a plurality of servo field areas 154 that generally radiate outwardly from the center of the disk 150. Each servo field area 154 is generally wedge shaped. Additionally, the disk 150 is generally partitioned into a plurality of concentric regions referred to as tracks 158. A servo field area 154 within a particular track 158 may be referred to as a servo mark. Each servo mark may include data which is pre-written on the disk 150 during manufacturing, and such data may include data concerning the location of the servo mark on the disk 150, such as the particular servo field area to which it corresponds and the track in which it is located. As can be seen in FIG. 2, each track 158 will include several servo marks. The servo mark data may be used by the hard disk system to position the magnetic head 116 during read and write operations. Data to be stored is written in the tracks 158 between the servo fields.

FIG. 3 is a diagram illustrating an example format of a servo mark 174. The servo mark 174 includes a pad field 178 that may include data used by the disk drive system for timing adjustment. The servo mark 174 may also include a phase-locked loop (PLL) and automatic gain control (AGC) field 180. The PLL/AGC field 180 includes a pattern which is used by the RWC 136 to synchronize a PLL of the RWC 136. Additionally, the PLL/AGC field 180 includes a pattern which is used by the RWC 136 to adjust an AGC module of the RWC 136.

The servo mark 174 also includes a servo address mark (SAM) field 182 and a track ID field 184. The SAM field 182 and the track ID field 184 each include a pattern indicative of digital data. For example, the SAM field 182 includes data indicative of the servo field to which the servo mark 174 corresponds. Similarly, the track ID field 184 includes data indicative of the track to which the servo mark 174 corresponds. The actuator controller 140 may utilize the track ID field 184 in positioning the magnetic head 116 over the desired track. For instance, signals generated as the magnetic head 116 moves over the track ID field 184 may indicate to the actuator controller 140 the track over which the magnetic head 116 is currently located.

The servo mark 174 further includes a second pad field 186, a first position signal (PS1) field 188, a third pad field 190, and a second position signal (PS2) field (PS2) 192. The PS1 field 188 and the PS2 field 192 include one or more patterns that, when the magnetic head 116 passes over, causes a signal indicative of a position of the magnetic head 116 within the track to be generated. Such signals may be used by the actuator controller 140 as feedback to more accurately position the magnetic head 116 over the center of the desired track.

FIG. 4 is an illustration of a portion of an example position signal (PS) field 200 within a track of a disk. The PS field 200 may be used for the PS1 field 188 and/or the PS2 field 192 in FIG. 3. The PS field 200 includes a first burst 204 and a second burst 208. The alternate black and shaded strips in FIG. 4 represent opposite magnetization states of the media. At least a portion of the first burst 204 is located within the track (it may extend into an adjacent track, for example) but it does not span the entire width of the track. Similarly, at least a portion of the second burst 208 is located within the track but does not span the entire width of the track. Additionally, the burst 204 is at a different radial position (or "cross-track position") within the track as compared to the radial position of the burst 208. Further, the burst 204 is at a different circumferential position (or "down track position") within the servo mark as compared to the circumferential position of the burst 208.

As the magnetic head 212 passes over the track in the down track direction, the magnetic head 212 passing over the burst patterns 204 and 208 will result in signals being generated. For instance, a signal corresponding to the burst 204 first will be generated, and then a signal corresponding to the burst 208 will be generated. The generated signals (hereinafter referred to as "position error signals") will vary depending upon the radial position of the magnetic head 212 within the track. A position estimate generator (a component of the read/write channel 136, for example) may analyze these signals to deduce the position of the magnetic head 116 within the track. The position estimate may be proved to the actuator controller 140, which may adjust the position of the magnetic head 116 based on the position estimate to more accurately position the magnetic head 116 over the center of the track. Patterns, such as the burst patterns 204 and 208, can be of various types such as amplitude patterns, null patterns, phase patterns, orthogonal patterns, dual frequency patterns, etc.

FIG. 5 is a block diagram of a prior art position estimate generator 250. The position estimate generator 250 includes an analog-to-digital converter (ADC) 254 that generates digital samples of the position error signals (PES). A PES demodulator 258 is coupled to an output of the ADC 254 and demodulates the digitized PES. Various techniques for PES demodulation may be employed, and the technique used may depend on the type of patterns employed.

For example, with a null-type pattern, a first magnetization pattern on one side of a centerline of a track is written 180° degrees out-of-phase with a second magnetization pattern on the other side of the centerline. When the magnetization head is directly straddling the track centerline, a PES signal corresponding to the first pattern should have an amplitude equal to an amplitude of a PES signal corresponding to the second pattern. If the head is off-center toward the first pattern, the amplitude corresponding to the first pattern will be larger than the amplitude corresponding to the second pattern. Similarly, if the head is off-center toward the second pattern, the amplitude corresponding to the second pattern will be larger than the amplitude corresponding to the first pattern. By determining the amplitudes of the signals corresponding to the first and second patterns, and then subtracting the amplitudes, a position estimate can be generated. For instance, the magnitude of the position estimate will indicate an approximate distance of the head from the centerline, with a zero value indicating a position on the centerline. Additionally, a sign of the position estimate indicates a direction of displacement from the centerline. The position estimate may be expressed as:

$$\text{Position\_Estimate} = \frac{\alpha_A - \alpha_B}{\alpha_A + \alpha_B} \qquad \text{(Equ. 1)}$$

where $a_A$ and $a_B$ represent estimated signal amplitudes corresponding to the burst 204 and the burst 208, respectively.

Thus, referring to FIG. 5, the PES demodulator 258 may determine amplitudes of signals corresponding to position patterns in a servo mark, for example. A position estimator 262 may receive the amplitude estimates determined by the PES demodulator 258 and may generate a position estimate based on the amplitude estimates. For example, the position estimator 262 may generate a position estimate according to Equ. 1.

SUMMARY OF THE DISCLOSURE

In one embodiment, a method for providing an estimate of a head position for a disk drive includes filtering a readback signal. The readback signal includes a first position signal component corresponding to a first position pattern on a disk, and includes a second position signal component corresponding to a second position pattern on the disk. Filtering the readback signal includes using a filter determined based on statistical information regarding a noise component of the readback signal. The method also includes generating an estimate of an amplitude of the first position signal component based on the filtered readback signal, and generating an estimate of an amplitude of the second position signal component based on the filtered readback signal. Additionally, the method includes generating an estimate of a head position with respect to a track on the disk based on the estimate of the amplitude of the first position signal component and the estimate of the amplitude of the second position signal component.

In another embodiment, an apparatus for providing an estimate of a head position for a disk drive comprises a filter having an input coupled to a readback signal. The readback signal includes a first position signal component corresponding to a first position pattern on a disk and a second position signal component corresponding to a second position pattern on the disk. The filter is configured to enhance a signal-to-noise ratio (SNR) of the readback signal with respect to the first position signal component and the second position signal component. The filter is configured based on statistical information regarding a noise component of the readback signal. The apparatus additionally comprises a position signal demodulator configured to generate an estimate of an amplitude of the first position signal component and an estimate of an amplitude of the second position signal component. The apparatus also comprises a position estimate generator configured to generate an estimate of a head position with respect to a track on the disk based on the estimate of the amplitude of the first position signal component and the estimate of the amplitude of the second position signal component.

In still another embodiment, a hard disk drive system comprises a storage medium having stored thereon first position information and second position information corresponding to at least one track of the storage medium. The hard disk drive system also comprises a magnetic head. Additionally, the hard disk drive system comprises and an actuator coupled to the magnetic head, and an actuator controller coupled to the actuator. Further, the hard disk drive system comprises a read channel coupled to the magnetic head. Still further, the hard disk drive system comprises a filter coupled to the read channel, wherein the filter is configured based on statistical information regarding a noise component of a readback signal. The readback signal includes a first position signal component corresponding to the first position information and a second position signal component corresponding to the second position information. The hard disk drive system also comprises an analog-to-digital convert to sample the readback signal. Still further, the hard disk drive system comprises a position signal demodulator configured to generate an estimate of an amplitude of the first position signal component and to generate an estimate of an amplitude of the second position signal component based on the sampled readback signal, and a position estimator coupled to the position signal demodulator and to the actuator controller.

DETAILED DESCRIPTION

A readback signal generated by a read channel device, the readback signal corresponding to a position signal pattern, can be modeled as:

$$r(t) = \alpha \sum_{k=0}^{L-1} a_k h(t - kT) + n(t) \quad \text{(Equ. 2)}$$

where $a_k$, k=0, . . . , L−1 denote bits of the pattern; T is a bit period; h(t) is a dibit response of the channel; and n(t) represents noise, which includes, but may not be limited to, additive white Gaussian noise incurred in the circuitry and media noise resulted from imperfect writing of the pattern. If $a_k$ is assumed to be periodic with a fundamental frequency ω, a Least Squares (LS) estimate, â, of a is:

$$\hat{\alpha} = \frac{1}{N} \sum_{k=0}^{N-1} r(kT) e^{-j\omega k} \quad \text{(Equ. 3)}$$

As is known to those of ordinary skill in the art, Equ. 3 can be implemented as a discrete Fourier transform (DFT) of r(kT), for example, where r(kT), for k=0, . . . , N−1, are samples of the readback signal r(t) at times corresponding to the burst pattern; and where o is the fundamental frequency of the burst signal.

Figure 6A:
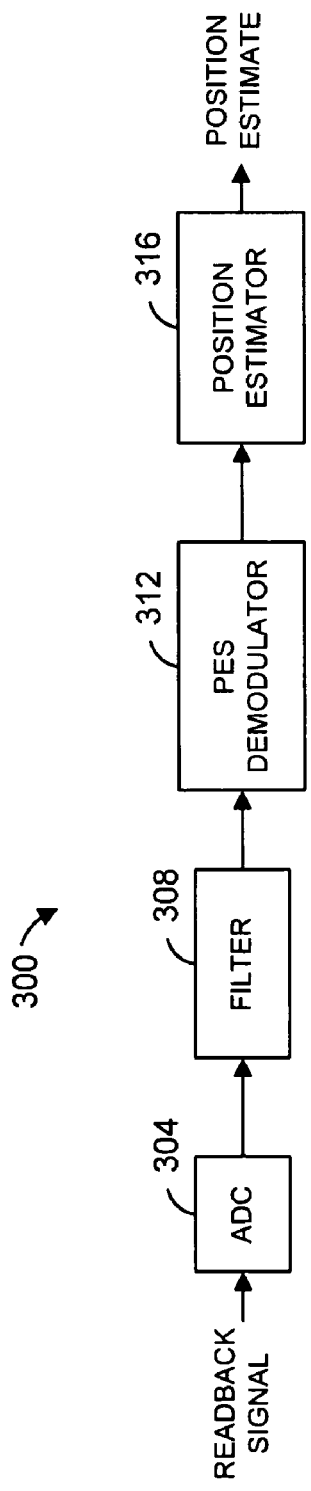
FIG. 6A is a block diagram of an example position estimate generator for generating an estimate of a position of a magnetic head of a disk drive system.

The LS estimate of a burst amplitude a is less accurate when the noise n(t) becomes correlated, which is the case for magnetic recording channels as well as for many other applications. FIG. 6A is a block diagram of an example position estimate generator 300 that mitigates performance degradation in the presence of correlated noise. The position estimate generator 300 includes an analog-to-digital converter (ADC) 304 that generates digital samples of a readback signal. An output of the ADC 304 is coupled to a filter 308. As will be described in more detail below, the filter 308 is configured to enhance a signal component of the readback signal and/or "whiten" a noise component of the readback signal.

A PES demodulator 312 is coupled to an output of the filter 308 and demodulates the digitized and filtered readback. Various techniques for PES demodulation may be employed, and the technique used may depend on the type of patterns employed. The PES demodulator 312 may include an amplitude estimate generator that determines amplitude estimates of signals corresponding to position patterns in a servo mark, for example. As an example, the PES demodulator 312 may determine amplitude estimates using a Least Squares (LS) technique. As another example, the PES demodulator 312 may determine amplitude estimates using a Weighted Least Squares (WLS) technique.

A position estimator 316 may be coupled to an output of the PES demodulator 312, and may generate a position estimate based on the amplitude estimates. For example, the position estimator 316 may generate a position estimate according to Equ. 1.

One example of the filter 308 will now be described. A signal component of the readback signal, the signal component corresponding to a burst pattern, will be referred to as s(t) and, for ease of explanation, is assumed to be a pure sinusoidal signal, i.e., $s(t)=e^{j\omega t}$, where ω is the fundamental frequency of the burst signal. Additionally, the following notations are used:

$S=[s_0, s_1, \ldots, s_{L-1}]^T$: noiseless signal samples of s(t), the signal samples corresponding to the burst pattern;

a: amplitude of the signal s(t);

$H=[h_0, h_1, \ldots, h_{L-1}]^T$: finite impulse response (FIR) of the filter 308, having a length L;

$R=[r_0, r_1, \ldots, r_{L-1}]^T$: signal samples of a readback signal r(t), the signal samples corresponding to the burst pattern; and Q: a covariance matrix of samples of a noise signal n(t).

The signal-to-noise ration (SNR) with respect to S at the output of the filter can be expressed as:

$$SNR = \frac{|\alpha|^2 H^H (SS^H) H}{H^H Q H} \quad \text{(Equ. 4)}$$

It is desired to choose a filter H such that the SNR with respect to S is maximized while the signal component S is passed undistorted, i.e., $$H^H S = 1. \quad \text{(Equ. 5)}$$

One solution to this optimization problem is given by:

$$H = \frac{Q^{-1} s}{S^H Q^{-1} S}. \quad \text{(Equ. 6)}$$

Since only a finite number of readback samples are available in practice, the FIR filter length L may be a compromise between resolution and statistical stability: a larger L may lead to generally better resolution but also may lead to generally worse statistical stability.

An estimate $\hat{Q}$ of the noise covariance matrix Q can be generated in a variety of ways. For example, $\hat{Q}$ can be generated based on a covariance matrix of the readback signal. In particular, a covariance matrix of the readback signal can be expressed as:

$$\hat{R} = \frac{1}{L} \sum_{l=0}^{L-1} r(l) r(l)^H \quad \text{(Equ. 7)}$$

The estimate $\hat{Q}$ of the noise covariance matrix Q can be generated as:

$$\hat{Q} = \hat{R} - \sum_{k=1}^{K} g(\omega_k) g(\omega_k)^H \quad \text{(Equ. 8)}$$

where g(ω) is the DFT of r(l). Of course, one of ordinary skill in the art will recognize other ways to generate an estimate of the noise covariance matrix Q. $\hat{Q}$ can be generated ahead of time and then remain fixed during normal operation of the disk drive. Alternatively, $\hat{Q}$ can be generated and/or updated during normal operation of the disk drive.

Elements of the signal vector S in Equ. 6 can alternatively be replaced by samples from a real-valued signal, e.g., s(t)=cos(ωt+φ), where φ can be some arbitrary phase chosen to simplify the computation. Using a real-valued signal, e.g., s(t)=cos(ωt+φ), instead of complex signal $e^{j\omega t}$ leads to real-valued filter coefficients, which in general may help simplify the hardware/software implementation of the filter 308.

Although one example filter 308 was describe above, one of ordinary skill in the art will recognize that other filters may be utilized. In general, the filter 308 is configured to enhance the SNR of the readback signal with respect to S. This may include a filter configured, for example, to enhance the signal component with respect to the noise component and/or to whiten the noise component.

Although the filter 308 and the PES demodulator 312 are illustrated as two separate blocks in FIG. 6A, it is to be understood that the filter 308 and the PES demodulator 312 could be implemented as a single integrated block. The filter 308 may operate in the T-spaced domain or in a fractionally-spaced domain (i.e., a fraction of T). Also, the filter 308 could be dedicated to the position estimate generator 300 or it could be shared with other components of the hard disk drive system. The filter 308 may be a fixed but tunable filter or it may be an adaptive filter.

It is to be understood that the filter 308 need not be an FIR filter. Alternatively, the filter 308 could be an infinite impulse response (IIR) filter. Also, it is to be understood that the filter 308 need not be a digital filter.

Figure 6B:
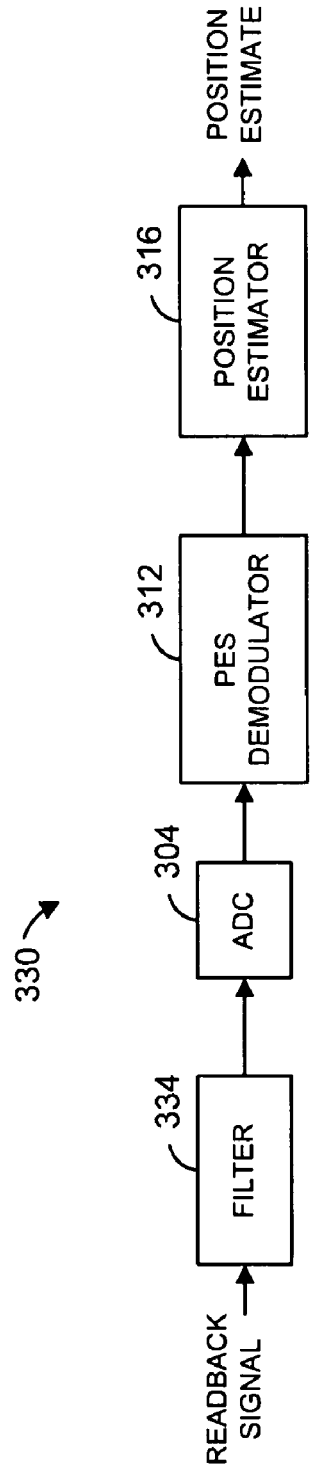
FIG. 6B is a block diagram of another example position estimate generator.

Referring now to FIG. 6B, a block diagram of another example position estimate generator 330 is illustrated. In the estimate generator 330, an input of an analog filter 334 is coupled to the readback signal and an output of the analog filter 334 is coupled to an input of the ADC 304. The output of the ADC 304 is coupled to the PES demodulator 312. In this example, the analog filter 334 is configured to enhance the SNR of the readback signal with respect to S.

Figure 1:
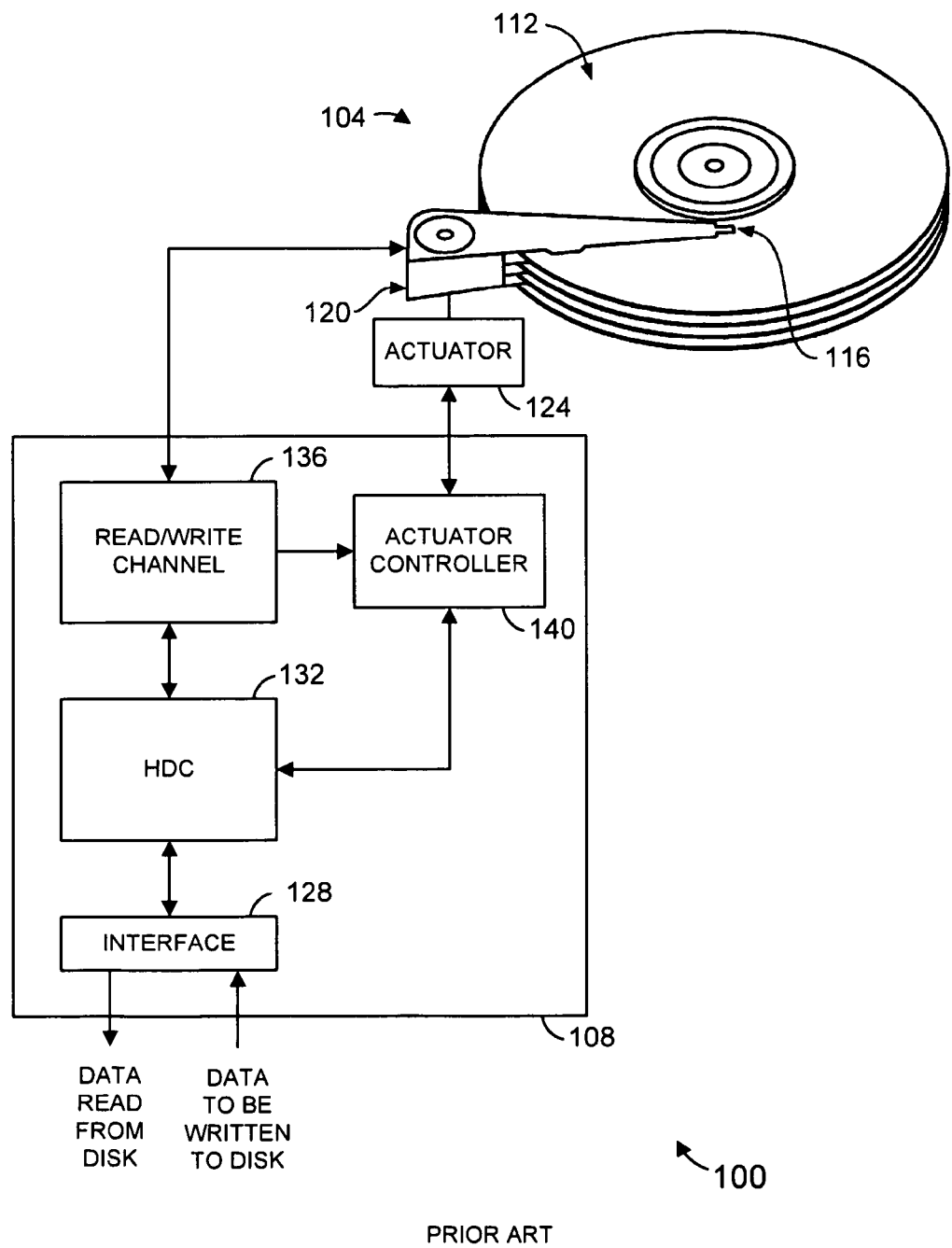
FIG. 1 a block diagram of prior art magnetic disk drive system.
Figure 2:
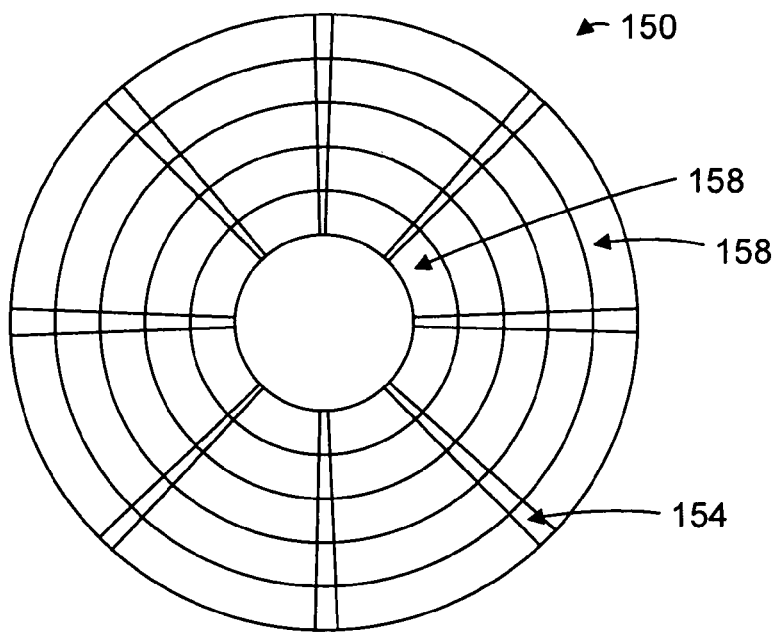
FIG. 2 is an illustration of an example magnetic media disk that may be utilized in the disk drive system of FIG. 1.
Figure 3:
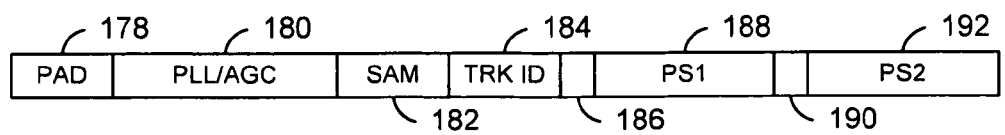
FIG. 3 a diagram illustrating an example format of a servo mark of the magnetic media disk of FIG. 2.
Figure 4:
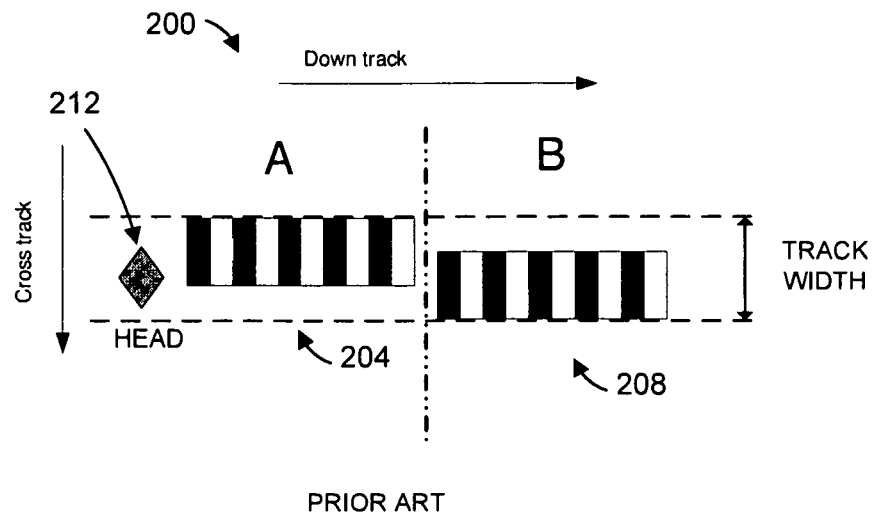
FIG. 4 is an illustration of a portion of an example position signal (PS) field within a track of a disk.
Figure 5:
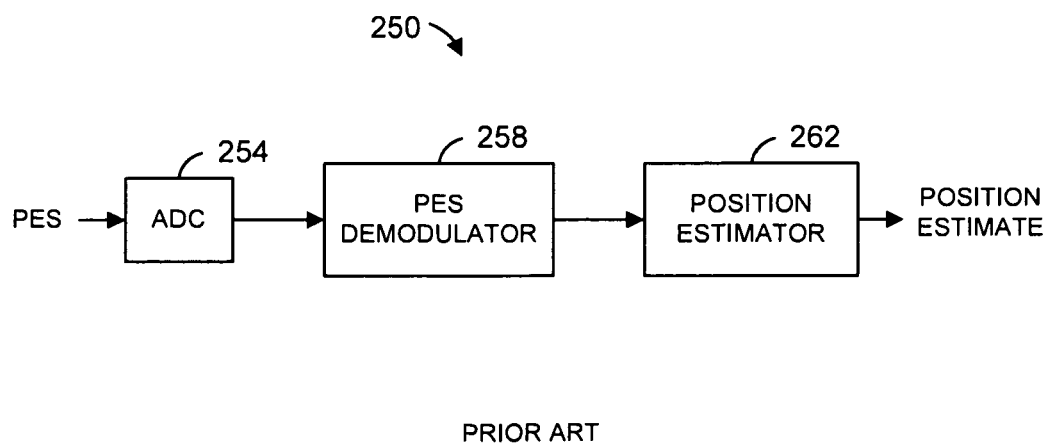
FIG. 5 is a block diagram of a prior art position estimate generator for generating an estimate of a position of a magnetic head of a disk drive system.
Figure 7:
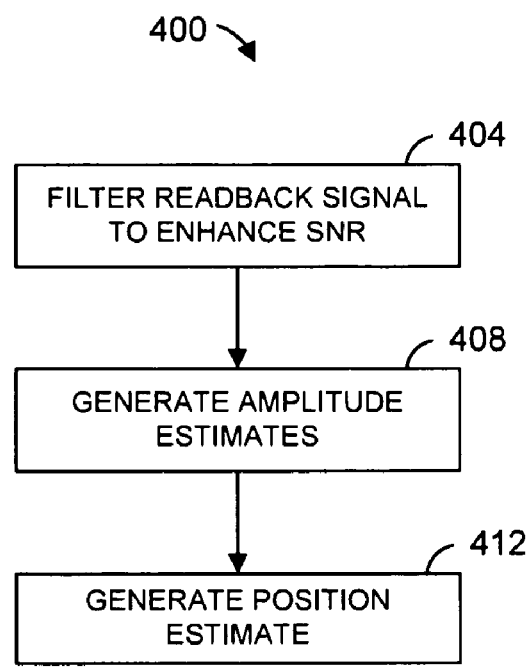
FIG. 7 is a flow diagram of an example method for generating an estimate of a position of a magnetic head of a disk drive system.

FIG. 7 is a flow diagram of an example method 400 for generating position estimates. At a block 404, a readback signal may be filtered with a filter configured to enhance an SNR of the readback signal. As discussed above, the filtering block 404 may be implemented prior to or after conversion of the readback signal to digital samples. At a block 408, amplitude estimates for signal components corresponding to position patterns of a servo mark may be generated. Referring to FIG. 4 as an illustrative example, a first amplitude estimate corresponding to the pattern 204 of the example PS field 200 and a second amplitude estimate corresponding to the pattern 208 may be generated. Amplitude estimates may be generated using a variety of techniques, including known techniques. For example, generate amplitude estimates may include utilizing a LS or WLS technique.

Then, at a block 412, a position estimate may be generated based on the amplitude estimates generated at the block 408. As just one example, a position estimate may be generated according to Equ. 1.

One of ordinary skill in the art will recognize many modifications to the flow of FIG. 7. For example, in some implementations, the blocks 404 and 408 may be combined into a single integrated block.

One of ordinary skill in the art will recognize that techniques similar to those as described above may be utilized in environments other than disk drives. For example, similar techniques may be utilized in communications environments when it is desired to determine the amplitude of a signal component in a noisy signal. More generally, such techniques may be utilized in a variety of electronic devices such as communication devices, computation devices, storage devices, networking devices, measurement devices, etc., in which it is desired to determine the amplitude of a signal component in a noisy signal where the noise is non-white.

Figure 8:
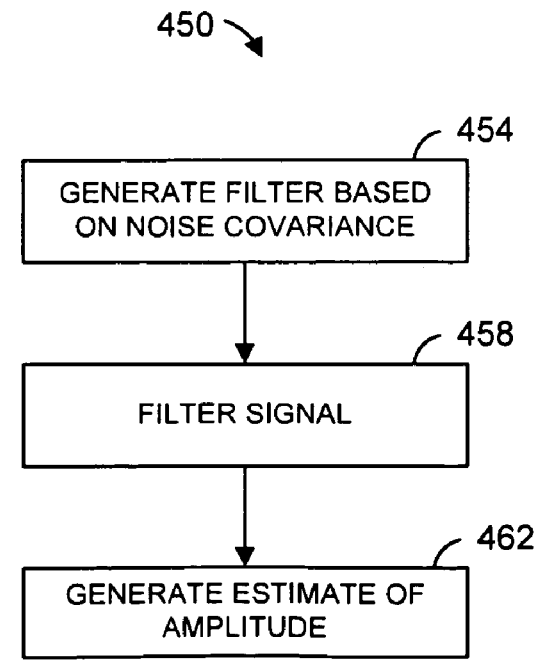
FIG. 8 is a flow diagram of an example method for generating an estimate of an amplitude of a signal component of a noisy signal.

FIG. 8 is a flow diagram of an example method 450 for generating an estimate of an amplitude of a sinusoidal signal component in a noisy signal. At a block 454, a filter may be generated based on covariance information associated with a noise component of the noisy signal. For example, coefficients of the filter could be generated according to Equ. 6. The filter may be generated using other techniques as well. Generating the filter optionally may comprise updating previously generated filter parameters.

At a block 458, the noisy signal may be filtered using the filter generated at the block 454. Then, at a block 462, an estimate of the amplitude of the signal component may be generated based on the filtered noisy signal. The amplitude estimate may be generated using a variety of techniques, including known techniques. For example, generating the amplitude estimate may include utilizing a LS or WLS technique.

One of ordinary skill in the art will recognize many modifications to the flow of FIG. 8. For example, in some implementations, the blocks 458 and 462 may be combined into a single integrated block.

Figure 9:
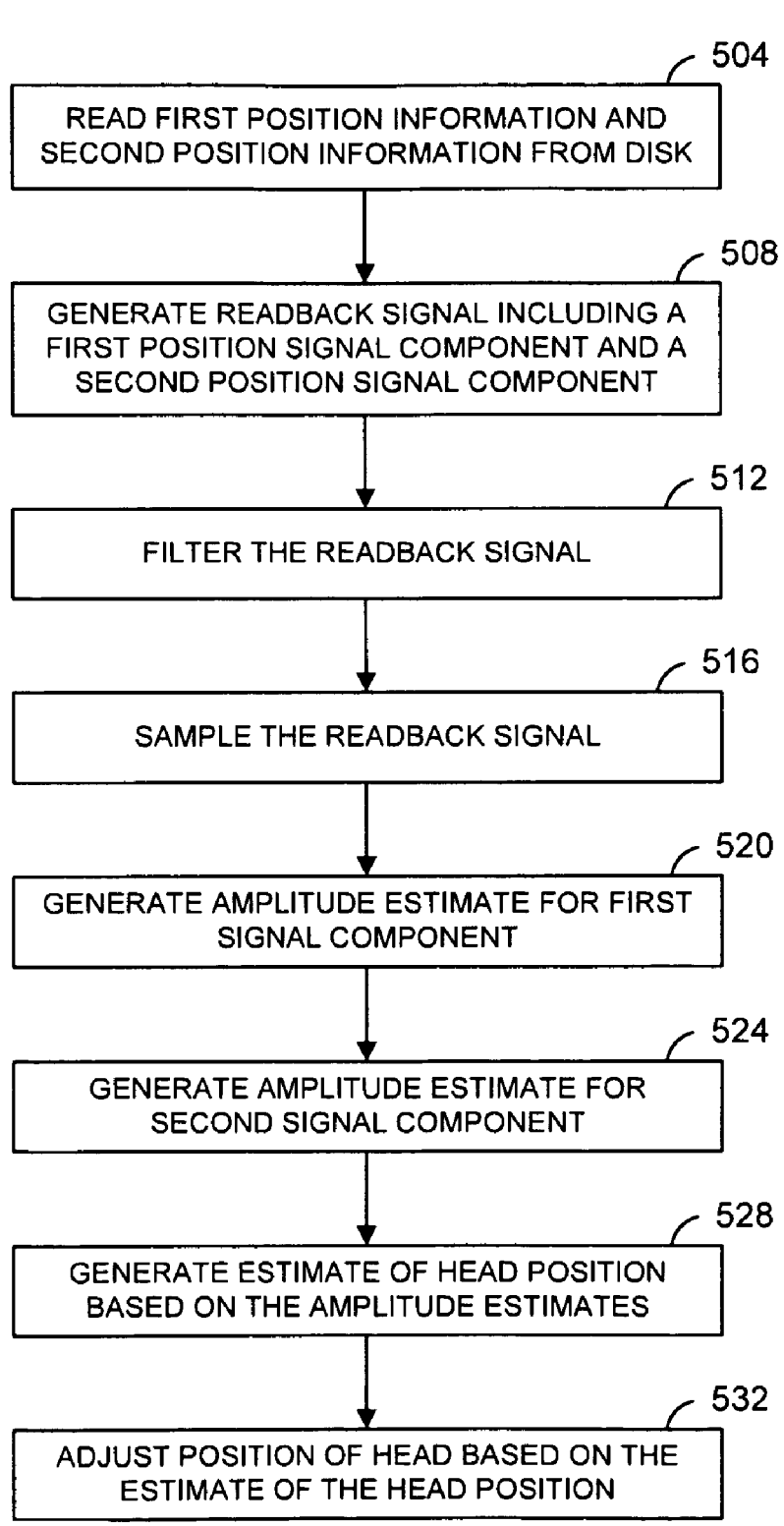
FIG. 9 is a flow diagram of an example method for adjusting the position of a magnetic head of a disk drive system.

FIG. 9 is a flow diagram of an example method 500 for positioning a magnetic head of a disk drive system. At a block 504, first position information and second position information recorded on at least one track of a storage medium are read with a magnetic head. For example, the first position information and second position information may correspond to burst patterns such as the burst patterns 204 and 208 of FIG. 4, or other types of position signal patterns. At a block, 508, a readback signal is generated. The readback signal includes a first position signal component corresponding to the first position information and a second position signal component corresponding to the second position information.

At a block 512, the readback signal is sampled with a filter configured to enhance a signal-to-noise ratio (SNR) of the readback signal. For instance, parameters of the filter may be generated based on covariance information associated with a noise component of the readback signal. As a specific example, coefficients of the filter could be generated according to Equ. 6.

At a block 516, the readback signal may be sampled with an analog-to-digital converter. Sampling may occur prior to or after the block 512. In other words, the filter of the block 512 may be an analog filter or a digital filter.

At a block 520, an estimate of the amplitude of the first signal component may be generated. Similarly, at a block 524, an estimate of the amplitude of the second signal component may be generated. The amplitude estimates may be generated using a variety of techniques, including known techniques. For example, generating the amplitude estimates may include utilizing a LS or WLS technique.

At a block 528, an estimate of a head position with respect to a track on the disk may be generated based on the amplitude estimates generated at the blocks 520 and 524. As just one example, a position estimate may be generated according to Equ. 1.

At a block 532, the position of the head may be adjusted based on the position estimate generated at the block 528. For example, if the position estimate indicates that the head is off-center within a desired track, an actuator controller may cause an actuator to move the head toward the center of the track.

Signal amplitude estimation and head position estimation techniques such as described above may be utilized in a variety of devices. Referring now to FIGS. 10A-10H, a few specific examples of devices that may utilize signal amplitude estimation and/or head position estimation techniques such as described above will be described.

Figure 10A:
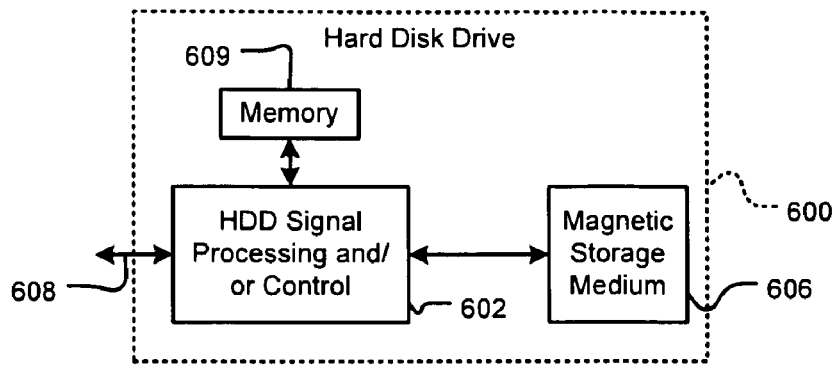
FIG. 10A is a block diagram of a hard disk drive system that may utilize a head position estimator and/or a signal amplitude estimator.

For example, referring to FIG. 10A, a hard disk drive 600 may include a signal amplitude estimator and/or head position estimator, which may be implemented by signal processing and/or control circuits, which are generally identified in FIG. 10A at 602. In some implementations, signal processing and/or control circuit 602 and/or other circuits (not shown) in HDD 600 may process data, perform coding and/or encryption, perform calculations, and/or format data that is output to and/or received from a magnetic storage medium 606. Additionally, signal processing and/or control circuit 602 and/or other circuits (not shown) in HDD 600 may generate head position control signals.

HDD 600 may communicate with a host device (not shown) such as a computer, mobile computing devices such as personal digital assistants, cellular phones, media or MP3 players and the like, and/or other devices via one or more wired or wireless communication links 608. HDD 600 may be connected to memory 609, such as random access memory (RAM), a low latency nonvolatile memory such as flash memory, read only memory (ROM) and/or other suitable electronic data storage.

Figure 10B:
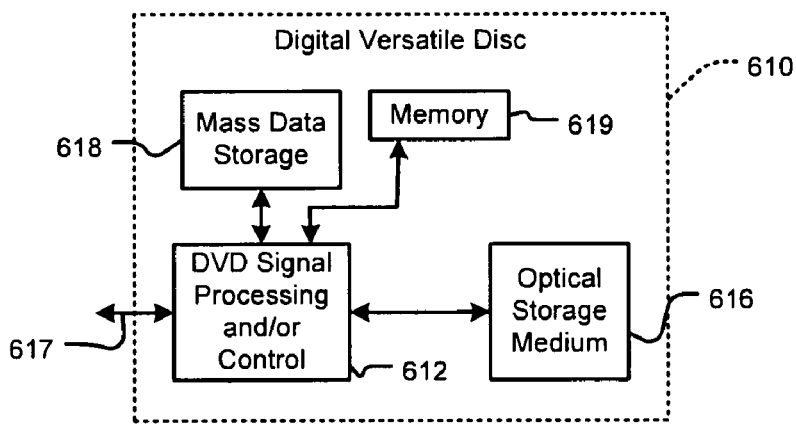
FIG. 10B is a block diagram of a digital versatile drive system that may utilize a head position estimator and/or a signal amplitude estimator.

Referring now to FIG. 10B, a signal amplitude estimator and/or head position estimator may be utilized in a digital versatile disc (DVD) drive 610. The signal amplitude estimator and/or head position estimator may be implemented by either or both signal processing and/or control circuits, which are generally identified in FIG. 10B at 612, and/or mass data storage 618 of DVD drive 610. Signal processing and/or control circuit 612 and/or other circuits (not shown) in DVD 610 may process data, perform coding and/or encryption, perform calculations, and/or format data that is read from and/or data written to an optical storage medium 616. In some implementations, signal processing and/or control circuit 612 and/or other circuits (not shown) in DVD 610 can also perform other functions such as encoding and/or decoding and/or any other signal processing functions associated with a DVD drive.

DVD drive 610 may communicate with an output device (not shown) such as a computer, television or other device via one or more wired or wireless communication links 617. DVD 610 may communicate with mass data storage 618 that stores data in a nonvolatile manner. Mass data storage 618 may include a hard disk drive (HDD) such as that shown in FIG. 10A. The HDD may be a mini HDD that includes one or more platters having a diameter that is smaller than approximately 1.8". DVD 610 may be connected to memory 619, such as RAM, ROM, low latency nonvolatile memory such as flash memory, and/or other suitable electronic data storage.

Figure 10C:
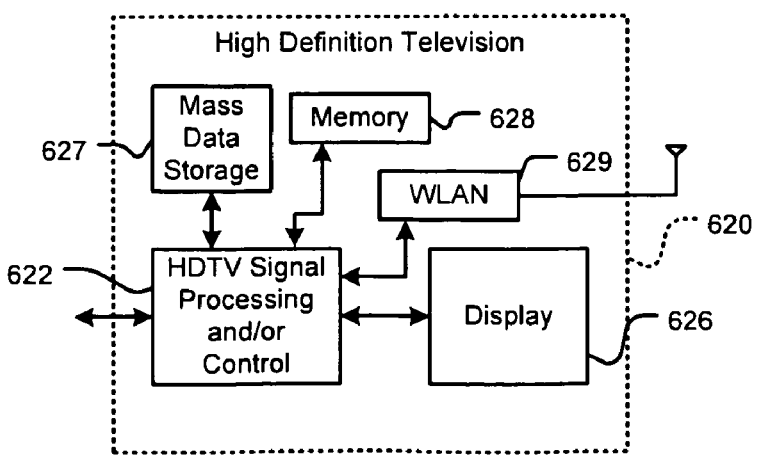
FIG. 10C is a block diagram of a high definition television that may utilize a head position estimator and/or a signal amplitude estimator.

Referring to FIG. 10C, a signal amplitude estimator and/or head position estimator may be utilized in a high definition television (HDTV) 620. The HDTV 620 includes signal processing and/or control circuits, which are generally identified in FIG. 10C at 622, a WLAN interface 629, and a mass data storage 627. The signal amplitude estimator may be utilized in the WLAN interface 629 or the signal processing circuit and/or control circuit 622, for example. HDTV 620 receives HDTV input signals in either a wired or wireless format and generates HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. The mass data storage 627 may include one or more hard disk drives (HDDs) and/or one or more digital versatile disks (DVDs). At least one HDD may have the configuration shown in FIG. 10A and/or at least one DVD may have the configuration shown in FIG. 10B. One or more of the HDDs may be a mini HDD that includes one or more platters having a diameter that is smaller than approximately 1.8". HDTV 620 may be connected to memory 628 such as RAM, ROM, low latency nonvolatile memory such as flash memory and/or other suitable electronic data storage.

HDTV 620 also may support connections with a WLAN via a WLAN network interface 629.

Figure 10D:
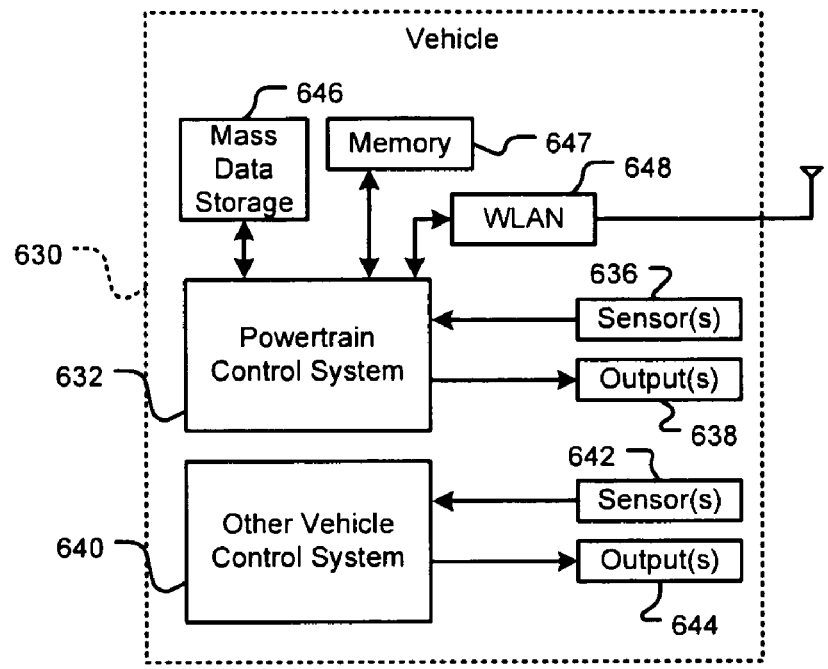
FIG. 10D is a block diagram of a vehicle that may utilize a head position estimator and/or a signal amplitude estimator.

Referring now to FIG. 10D, a signal amplitude estimator and/or head position estimator may be utilized in a control system of a vehicle 630. In some implementations, the signal amplitude estimator may be implemented by a powertrain control system 632 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The signal amplitude estimator may also be implemented in other control systems 640 of vehicle 630. Control system 640 may likewise receive signals from input sensors 642 and/or output control signals to one or more output devices 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices for example hard disk drives HDD and/or DVDs. At least one HDD may have the configuration shown in FIG. 10A and/or at least one DVD may have the configuration shown in FIG. 10B. One or more of the HDDs may be a mini HDD that includes one or more platters having a diameter that is smaller than approximately 1.8". Powertrain control system 632 may be connected to memory 647 such as RAM, ROM, low latency nonvolatile memory such as flash memory and/or other suitable electronic data storage. Powertrain control system 632 also may support connections with a WLAN via a WLAN network interface 648. The methods, systems, techniques, etc., described above may also be implemented in the WLAN interface 648. The control system 640 may also include mass data storage, memory and/or a WLAN interface (all not shown).

Figure 10E:
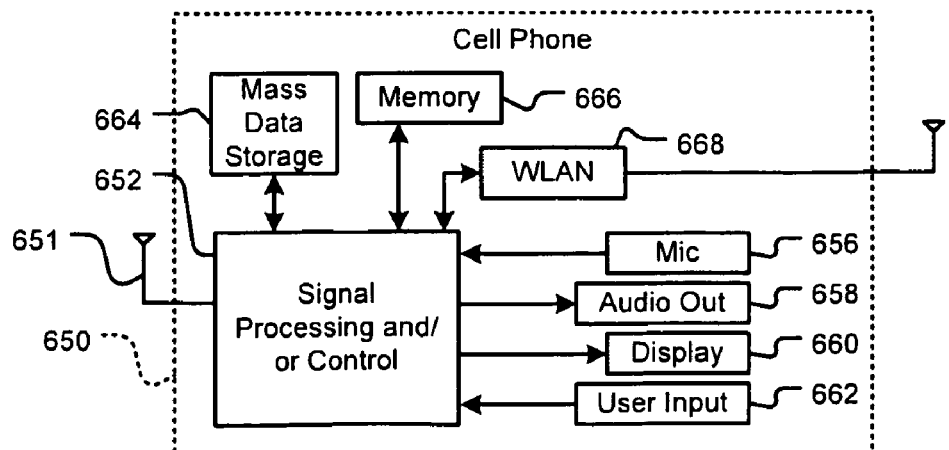
FIG. 10E is a block diagram of a cellular phone that may utilize a head position estimator and/or a signal amplitude estimator.

Referring now to FIG. 10E, a signal amplitude estimator and/or head position estimator may be utilized in a cellular phone 650 that may include a cellular antenna 651. The cellular phone 650 includes signal processing and/or control circuits, which are generally identified in FIG. 10E at 652, a WLAN interface 668, and a mass data storage 664. The signal amplitude estimator may be implemented in the signal processing and/or control circuits 652 and/or the WLAN interface 668, for example. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Cellular phone 650 may communicate with mass data storage 664 that stores data in a nonvolatile manner such as optical and/or magnetic storage devices for example hard disk drives HDD and/or DVDs. At least one HDD may have the configuration shown in FIG. 10A and/or at least one DVD may have the configuration shown in FIG. 10B. At least one HDD may be a mini HDD that includes one or more platters having a diameter that is smaller than approximately 1.8". Cellular phone 650 may be connected to memory 666 such as RAM, ROM, low latency nonvolatile memory such as flash memory and/or other suitable electronic data storage. Cellular phone 650 also may support connections with a WLAN via a WLAN network interface 668.

Figure 10F:
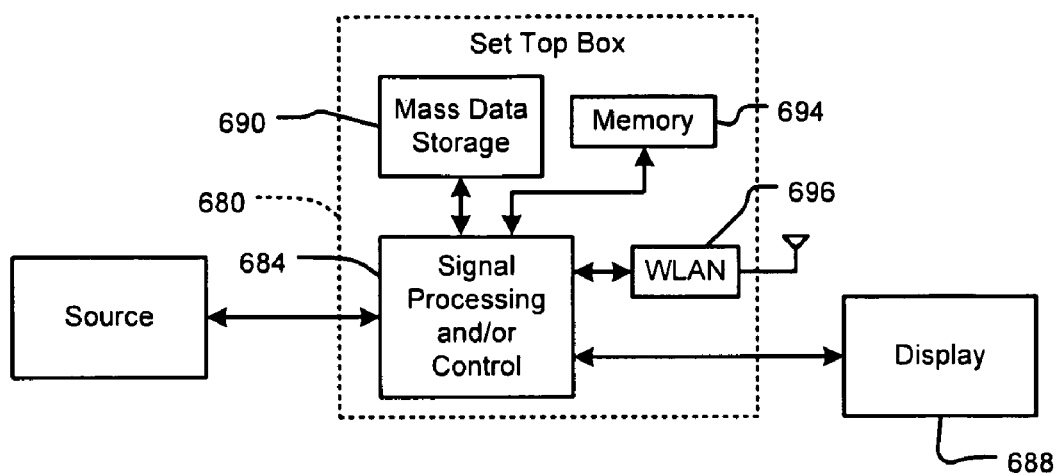
FIG. 10F is a block diagram of a set top box that may utilize a head position estimator and/or a signal amplitude estimator.

Referring now to FIG. 10F, a signal amplitude estimator and/or head position estimator may be utilized in a set top box 680. The set top box 680 includes signal processing and/or control circuits, which are generally identified in FIG. 6D at 684, a WLAN interface 696, and a mass data storage device 690. The signal amplitude estimator may be implemented in the signal processing and/or control circuits 684 and/or the WLAN interface 696, for example. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices for example hard disk drives HDD and/or DVDs. At least one HDD may have the configuration shown in FIG. 10A and/or at least one DVD may have the configuration shown in FIG. 10B. At least one HDD may be a mini HDD that includes one or more platters having a diameter that is smaller than approximately 1.8". Set top box 680 may be connected to memory 694 such as RAM, ROM, low latency nonvolatile memory such as flash memory and/or other suitable electronic data storage. Set top box 680 also may support connections with a WLAN via a WLAN network interface 696.

Figure 10G:
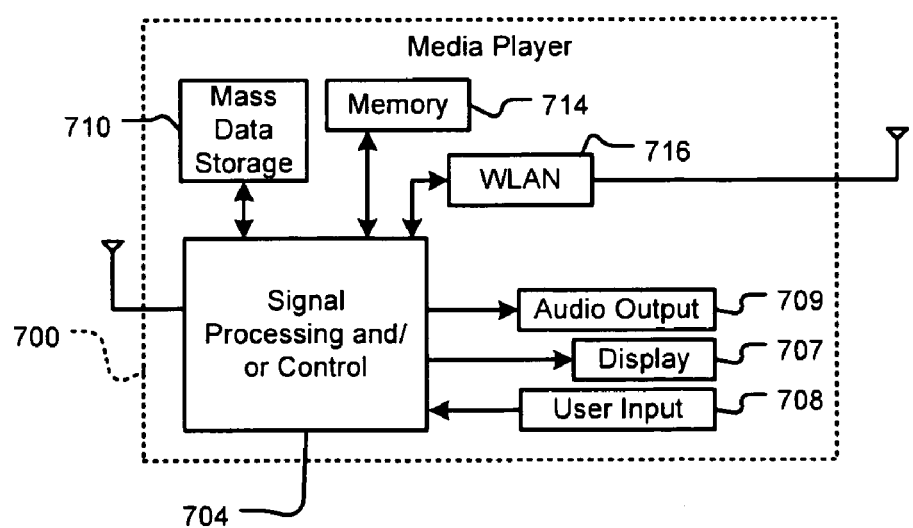
FIG. 10G is a block diagram of a media player that may utilize a head position estimator and/or a signal amplitude estimator.

Referring now to FIG. 10G, a signal amplitude estimator and/or head position estimator may be utilized in a media player 700. The media player 700 may include signal processing and/or control circuits, which are generally identified in FIG. 10G at 704, a WLAN interface 716, and a mass data storage device 710. The signal amplitude estimator may be implemented in the signal processing and/or control circuits 704 and/or the WLAN interface 716, for example. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 10A and/or at least one DVD may have the configuration shown in FIG. 10B. At least one HDD may be a mini HDD that includes one or more platters having a diameter that is smaller than approximately 1.8". Media player 700 may be connected to memory 714 such as RAM, ROM, low latency nonvolatile memory such as flash memory and/or other suitable electronic data storage. Media player 700 also may support connections with a WLAN via a WLAN network interface 716. Still other implementations in addition to those described above are contemplated.

Figure 10H:
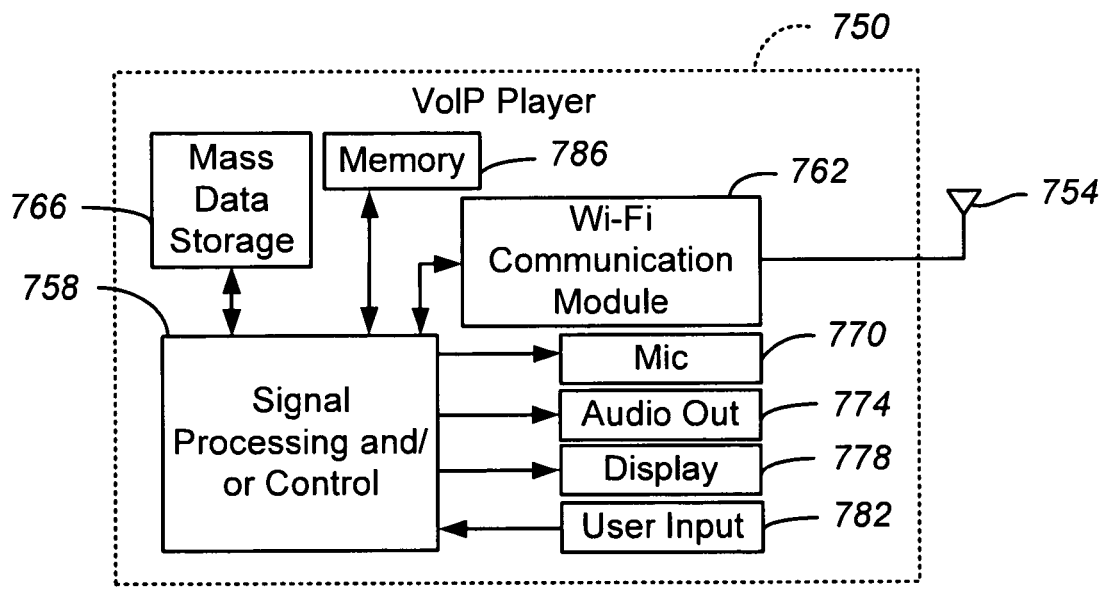
FIG. 10H is a block diagram of a voice over IP device that may utilize a head position estimator and/or a signal amplitude estimator.

Referring to FIG. 10H, a signal amplitude estimator and/or head position estimator may be utilized in a Voice over Internet Protocol (VoIP) phone 750 that may include an antenna 754, signal processing and/or control circuits 758, a wireless interface 762, and a mass data storage 766. The signal amplitude estimator may be implemented in the signal processing and/or control circuits 758 and/or the wireless interface 762, for example. In some implementations, VoIP phone 750 includes, in part, a microphone 770, an audio output 774 such as a speaker and/or audio output jack, a display monitor 778, an input device 782 such as a keypad, pointing device, voice actuation and/or other input devices, and a Wireless Fidelity (Wi-Fi) communication module 762. Signal processing and/or control circuits 758 and/or other circuits (not shown) in VoIP phone 750 may process data, perform coding and/or encryption, perform calculations, format data and/or perform other VoIP phone functions.

VoIP phone 750 may communicate with mass data storage 766 that stores data in a nonvolatile manner such as optical and/or magnetic storage devices, for example hard disk drives HDD and/or DVDs. At least one HDD may have the configuration shown in FIG. 10A and/or at least one DVD may have the configuration shown in FIG. 10B. At least one HDD may have the configuration shown in FIG. 10A and/or at least one DVD may have the configuration shown in FIG. 10B. The HDD may be a mini HDD that includes one or more platters having a diameter that is smaller than approximately 1.8". VoIP phone 750 may be connected to memory 786, which may be a RAM, ROM, low latency nonvolatile memory such as flash memory and/or other suitable electronic data storage. VoIP phone 750 is configured to establish communications link with a VoIP network (not shown) via Wi-Fi communication module 762.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

The invention claimed is:

1. A method for providing an estimate of a head position for a disk drive, the method comprising:
    filtering a readback signal, the readback signal including a first position signal component corresponding to a first position pattern on a disk and including a second position signal component corresponding to a second position pattern on the disk, wherein filtering the readback signal includes using a filter determined based on statistical information regarding a noise component of the readback signal;
    generating an estimate of an amplitude of the first position signal component based on the filtered readback signal;
    generating an estimate of an amplitude of the second position signal component based on the filtered readback signal; and
    generating an estimate of a head position with respect to a track on the disk based on the estimate of the amplitude of the first position signal component and the estimate of the amplitude of the second position signal component.

2. A method according to claim 1, wherein filtering the readback signal is based on an estimate of a noise covariance matrix associated with the readback signal.

3. A method according to claim 1, wherein filtering the readback signal comprises filtering the readback signal after sampling the readback signal.

4. A method according to claim 3, wherein filtering the readback signal includes using a finite impulse response (FIR) filter.

5. A method according to claim 1, wherein filtering the readback signal comprises filtering the readback signal prior to sampling the readback signal.

6. A method according to claim 1, wherein:
    filtering the readback signal is integral with generating the estimate of the amplitude of the first position signal component; and
    filtering the readback signal is integral with generating the estimate of the amplitude of the second position signal component.

7. A method according to claim 1, wherein:
    generating the estimate of the amplitude of the first position signal component comprises generating a Least Squares estimate of the amplitude of the first position signal component; and
    generating the estimate of the amplitude of the second position signal component comprises generating a Least Squares estimate of the amplitude of the second position signal component.

8. A method according to claim 1, wherein:
    generating the estimate of the amplitude of the first position signal component comprises generating a Weighted Least Squares estimate of the amplitude of the first position signal component; and
    generating the estimate of the amplitude of the second position signal component comprises generating a Weighted Least Squares estimate of the amplitude of the second position signal component.

9. A method according to claim 1, wherein generating the estimate of the head position comprises generating an estimate of a deviation of the head position from a centerline of the track.

10. A method according to claim 1, further comprising adjusting a position of a head in the disk drive based on the estimate of the head position.

11. An apparatus for providing an estimate of a head position for a disk drive, the apparatus comprising:
a filter implemented in a hardware device, the filter having an input coupled to a readback signal, the readback signal including first position signal component corresponding to a first position pattern on a disk and including a second position signal component corresponding to a second position pattern on the disk, wherein the filter is configured to enhance a signal-to-noise ratio (SNR) of the readback signal with respect to the first position signal component and the second position signal component, wherein the filter is configured based on statistical information regarding a noise component of the readback signal;
a position signal demodulator configured to generate an estimate of an amplitude of the first position signal component and an estimate of an amplitude of the second position signal component; and
a position estimate generator configured to generate an estimate of a head position with respect to a track on the disk based on the estimate of the amplitude of the first position signal component and the estimate of the amplitude of the second position signal component.

12. An apparatus according to claim 11, wherein the filter is configured based on an estimate of a noise covariance matrix associated with the readback signal.

13. An apparatus according to claim 11, further comprising an analog-to-digital converter having an input coupled to the readback signal and an output coupled to the input of the filter.

14. An apparatus according to claim 11, wherein the hardware device comprises a processor executing software instructions.

15. An apparatus according to claim 11, further comprising an analog-to-digital converter having an input coupled to the output of the filter and an output coupled to the input of the position signal demodulator.

16. An apparatus according to claim 11, wherein the filter is a module separate from the position signal demodulator.

17. An apparatus according to claim 11, wherein:
each of the first position signal component and the second position signal is located on the track; and
each of the first position signal component and the second position signal does not span an entire width of the track.

18. A hard disk drive system, comprising:
a storage medium having stored thereon first position information and second position information corresponding to at least one track of the storage medium;
a magnetic head;
an actuator coupled to the magnetic head;
an actuator controller coupled to the actuator;
a read channel coupled to the magnetic head;
a filter coupled to the read channel, wherein the first position signal component corresponds to the first position information and the second position signal component corresponds to the second position information, wherein the filter is configured based on statistical information regarding a noise component of a readback signal;
an analog-to-digital converter to sample the readback signal;
a position signal demodulator configured to generate an estimate of an amplitude of the first position signal component and to generate an estimate of an amplitude of the second position signal component based on the sampled readback signal; and
a position estimator coupled to the position signal demodulator and to the actuator controller.

19. A device communicatively coupled to the hard disk drive system of claim 18.

20. A device according to claim 19, wherein the device comprises at least one of a cellular phone, a set top box, a gaming system, a server, a personal computer, or a personal digital assistant (PDA).

* * * * *